Oct. 3, 1944.  J. W. BRYCE  2,359,616
ACCOUNTING MACHINE
Filed June 18, 1941  6 Sheets-Sheet 1
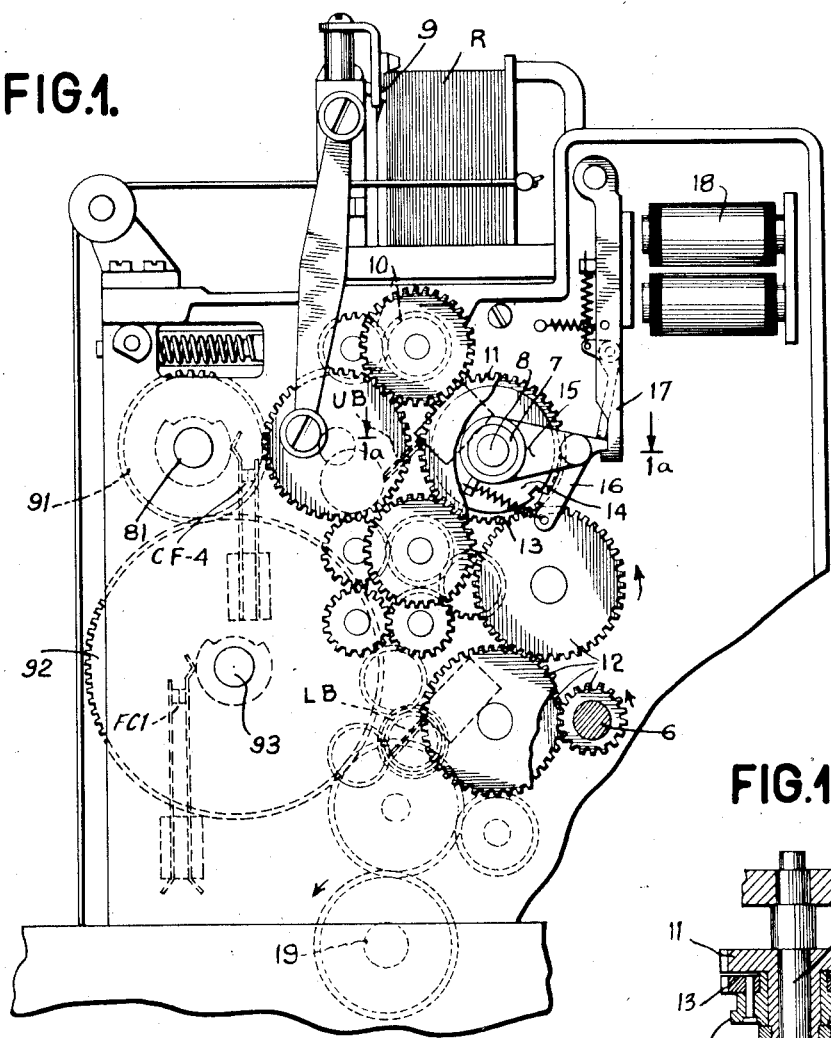

Oct. 3, 1944.  J. W. BRYCE  2,359,616

ACCOUNTING MACHINE

Filed June 18, 1941  6 Sheets-Sheet 2

INVENTOR
James W. Bryce
BY
ATTORNEY

Oct. 3, 1944.    J. W. BRYCE    2,359,616
ACCOUNTING MACHINE
Filed June 18, 1941    6 Sheets-Sheet 3
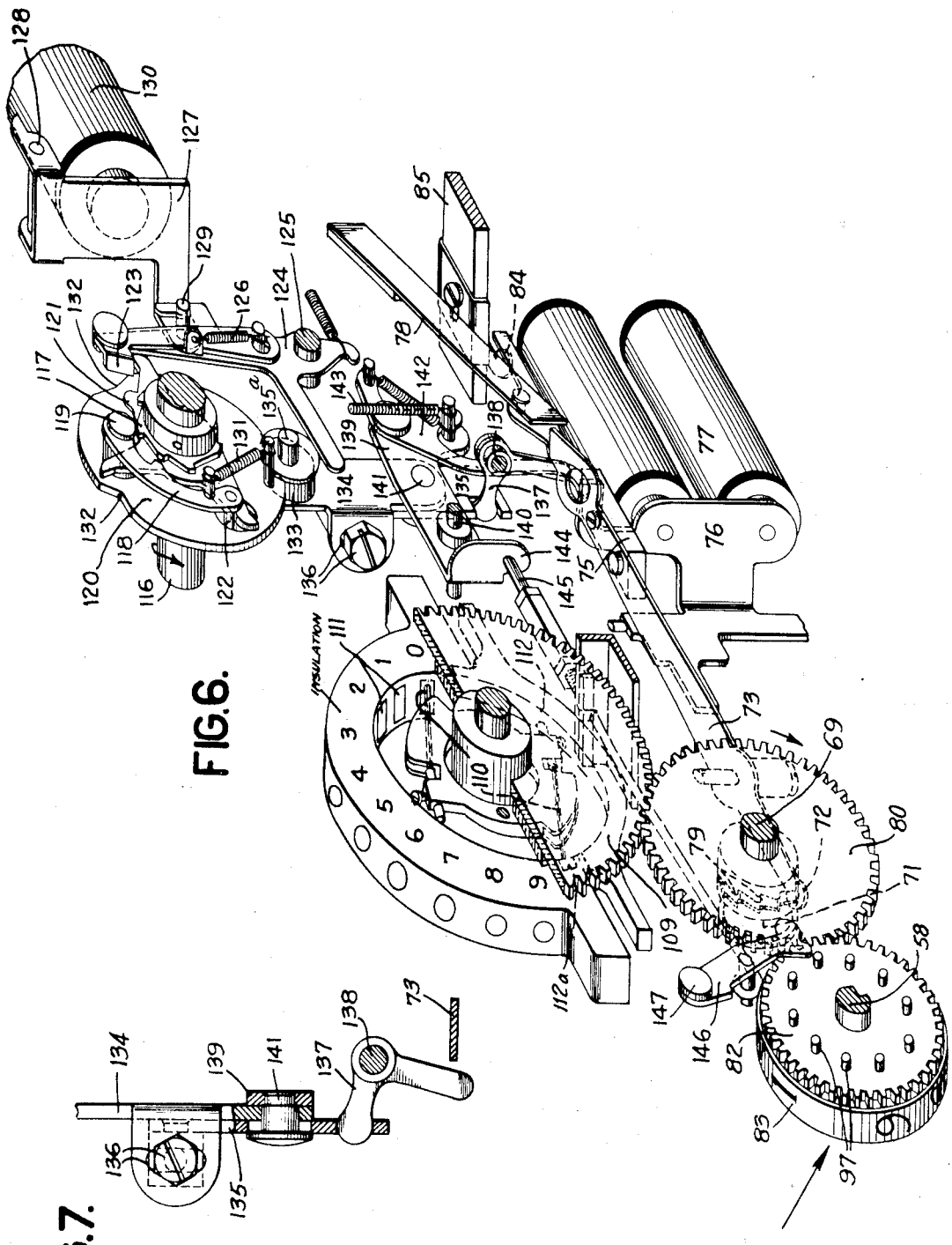
INVENTOR
James W. Bryce
by W. M. Wilson
ATTORNEY Oct. 3, 1944.  J. W. BRYCE  2,359,616

ACCOUNTING MACHINE

Filed June 18, 1941  6 Sheets-Sheet 4

INVENTOR
James W. Bryce
BY
ATTORNEY

Oct. 3, 1944.   J. W. BRYCE   2,359,616
ACCOUNTING MACHINE
Filed June 18, 1941   6 Sheets-Sheet 5

Oct. 3, 1944.                J. W. BRYCE                2,359,616
                         ACCOUNTING MACHINE
               Filed June 18, 1941           6 Sheets-Sheet 6

INVENTOR
James W. Bryce
BY
ATTORNEY

Patented Oct. 3, 1944

2,359,616

UNITED STATES PATENT OFFICE 2,359,616

ACCOUNTING MACHINE

James W. Bryce, Glen Ridge, N. J., assignor to International Business Machines Corporation, New York, N. Y., a corporation of New York Application June 18, 1941, Serial No. 398,518

5 Claims. (Cl. 235—61.7)

The invention relates to accounting machines and more particularly to accounting machines of the record controlled type.

The principal object of the invention is to provide a machine in which perforated record cards are each sensed for the same data by two separate sensing devices each of which controls its own related calculating mechanism, so that two results are obtained which are independently arrived at. Comparison is effected and, if the two results are found to be unlike, the machine is stopped. If the results are the same, further machine operations ensue under control of one of the mechanisms.

In its specific construction the machine incorporates many well known structural elements so that the results sought are obtained in a simple and economic manner.

It is well known accounting practice, especially where the calculation of money values is concerned, to calculate the same results separately and independently on two different machines which may be record controlled or key operated or both. This procedure involves handling all items twice, once for each machine so that the entire procedure is tedious and time consuming.

The arrangement of the present invention obtains the advantages of a double independent calculation and in addition an automatic comparison of the two results without the necessity of handling the items twice, saving time and by using a single machine thus saving cost.

The perforated record cards are fed past two sensing stations both of which sense the same data, and each controls a separate accumulator. The accumulators are so controlled that one records a true total and the other the complement thereof. Upon completion of sensing and before printing or other operations are effected under control of the accumulators, the amount in one is transferred to the other and, if the results are the same, such other accumulator will be advanced to a zero reading which is indicative of the concurrence of the two separately obtained results.

Other objects of the invention will be pointed out in the following description and claims and illustrated in the accompanying drawings, which disclose, by way of example, the principle of the invention and the best mode, which has been contemplated, of applying that principle.

In the drawings:

Fig. 1 is an outside view of the card feeding and sensing mechanism showing the card feed declutching devices.

Fig. 1a is a detail section taken on line 1a—1a of Fig. 1.

Fig. 2 is a detail view of the controlling devices of the accumulator resetting mechanism.

Fig. 6 is an isometric view of one denominational order of a subtracting accumulator.

Fig. 7 is a detail of certain parts shown in Fig. 6.

Figure 10:
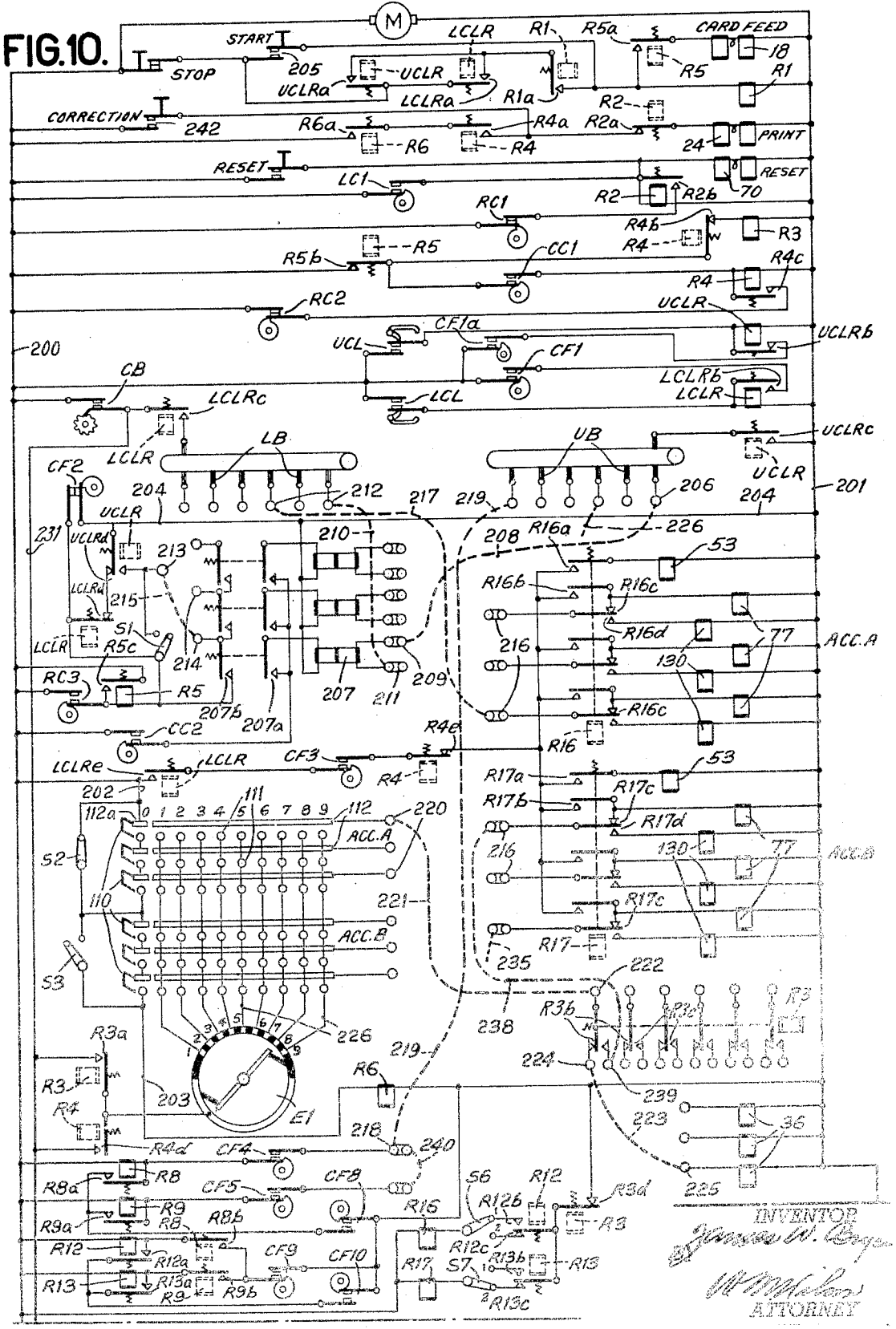
Figure 10A:
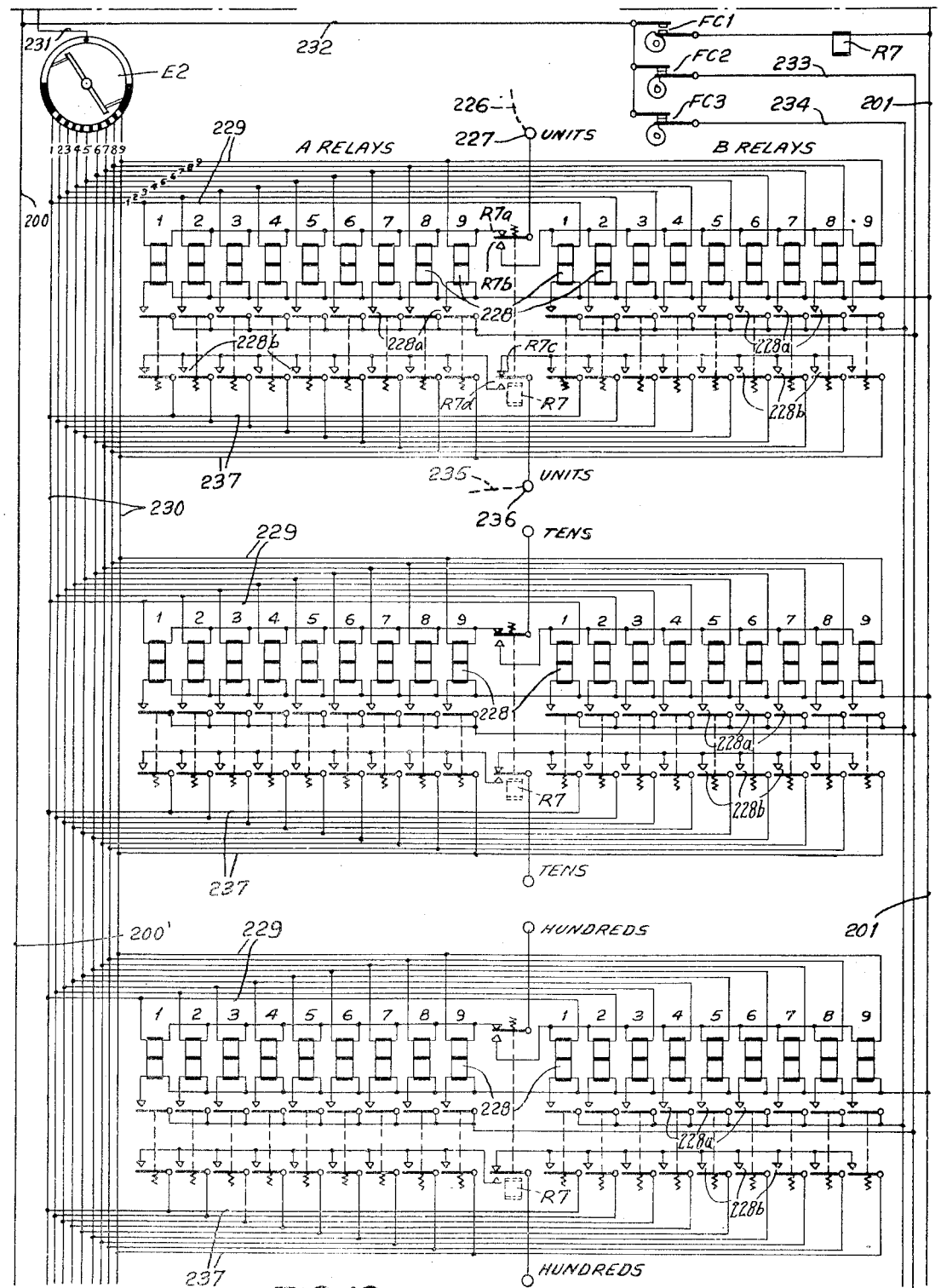

Figs. 10 and 10a, taken together and placed one above the other, constitute a wiring diagram of the electric circuits of the machine.

The machine to which the features of the present invention are applied is similar in its mechanical organization to that shown in the Patent 2,126,621 issued to G. F. Daly on August 9, 1938, with certain modifications as will be pointed out hereinafter. The structure of the machine will first be briefly explained before the operation is set forth in connection with the circuit diagram.

Card feeding mechanism

The card feeding mechanism shown in Fig. 1 is exactly similar to that shown and described in Patent 1,976,617, issued to C. D. Lake et al. on October 9, 1934, except that provision is made in the form of a clutching device for interrupting the card feeding operations without stopping the accumulating drive mechanism. The analyzing brushes are indicated at UB and LB and the record cards R are successively advanced by picker 9 to pairs of feed rollers 10, which serve to advance the cards past the upper and lower brushes in succession. The shafts upon which rollers 10 are mounted are provided with gears at their extremities and arranged as shown in Fig. 1 for operation by a main driving gear 11 which is freely mounted upon a shaft 8 (Fig. 1a) and which has connection with an arm 15 through a sleeve 7. Arm 15 carries spring pressed clutching dog 16 normally held in the position shown by an armature latch 17 which is adapted to be controlled by the clutch magnet 18. Between gear 11 and arm 15 are a gear 13 and a clutch driving disk 14 freely rotatable upon the sleeve 7. Gear 13 has gear connection generally designated 12 with the pulley shaft 6 which is in operation as long as the main driving motor is operative. Energization of magnet 18 will trip dog 16 into engagement with disk 14 and the card feeding mechanism will cause cards to be advanced past the brushes UB and LB and feeding operations will continue as long as magnet 18 remains energized. During transferring, resetting and total printing cycles of operation, magnet 18 is deenergized and card feeding will, of course, not take place during such cycles.

Printing mechanism

Figure 3:
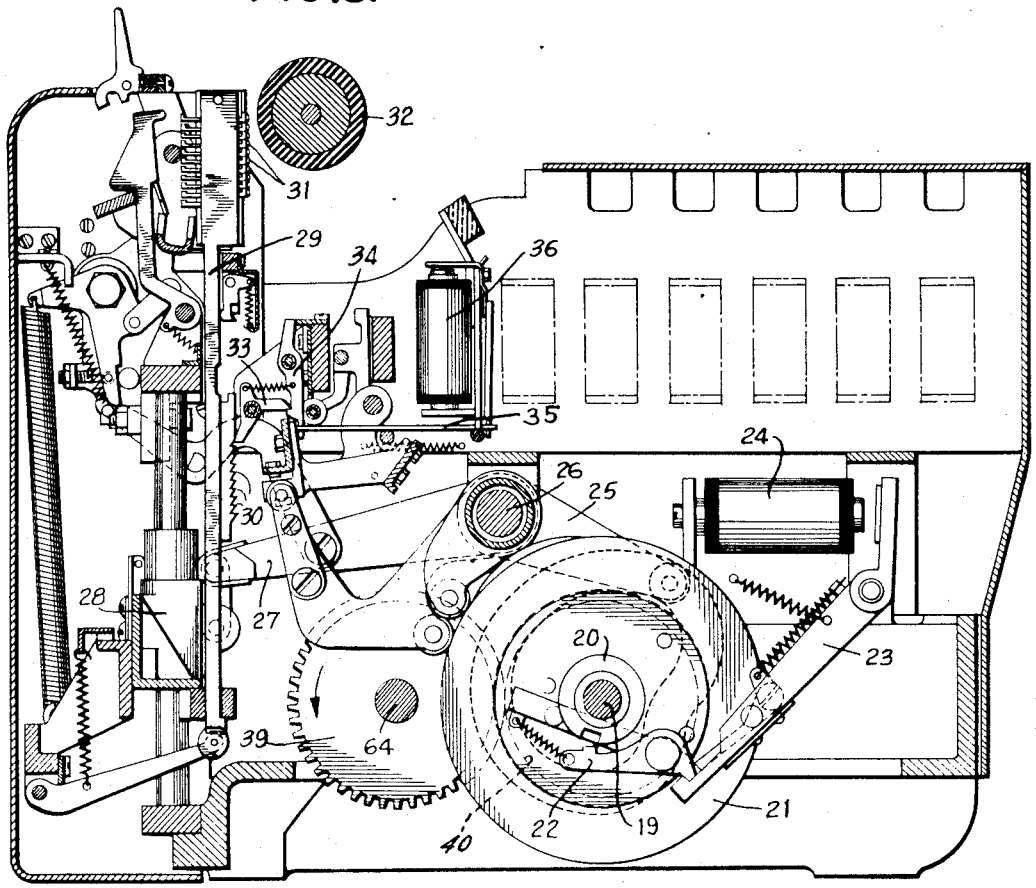
Fig. 3 is a central section of the essential elements of the printing mechanism.

The printing mechanism is shown in Fig. 3 where the usual so-called listing shaft 19 carries a clutch driving element 20. Shaft 19 has direct driving connection with the constantly running shaft 6 (Fig. 1), so that clutch driving element 20 may rotate continuously. The listing cam 21 is freely carried on the shaft 19 and provided with a spring pressed clutching dog 22 adapted for engagement with the driving element 20. Dog 22 is normally held out of engagement by arm 23 controlled by magnet 24. Energization of magnet 24 will permit cam 21 to rotate with the listing shaft 19, and follower arm 25 will cause oscillation of rocker shaft 26 to which are secured arms 27 link connected to the reciprocating crosshead 28, so that for each revolution of cam 21 crosshead 28 will be moved upwardly and then down again to its initial position.

Slidingly mounted in the crosshead are type bars 29 spring urged into movement with the crosshead as it rises. As type bar 29 moves upwardly, ratchet teeth 30 successively pass the nose of stopping pawl 33 as the type elements 31 successively pass printing position opposite platen 32. Energization of printing magnet 36 as the type bar moves upwardly will draw call wire 35 toward the right to rock latch 34 out of engagement with stopping pawl 33, whereby the nose of the latter will engage one of the teeth 30 and interrupt further upward movement of the type bar. The upward movement of the type bar is synchronized with the movement of the record card past the analyzing brushes, and if the machine is set for "listing," a perforation sensed by the brushes will energize the magnet 36 to interrupt the type bar with the type element 31 corresponding to the value of the digit represented by the analyzed perforation in printing position. Before the crosshead 28 moves downwardly, the usual printing hammers are tripped to take an impression from the selected type elements. Cam 21 controls the movement of the crosshead 28 during both listing and total printing operations.

Accumulating mechanism

The adding mechanism is entirely similar to that shown and described in the patents referred to, and the description thereof will accordingly be limited to a brief explanation of its manner of operation. The drive shaft 69 (Fig. 6) is directly geared to pulley shaft 6 of Fig. 1, so that it is in operation as long as the driving motor of the machine functions and the driving ratio is such that shaft 69 makes one revolution for each card feeding cycle of the machine. Shaft 69 has slidably mounted thereon but keyed for rotation therewith a clutch element 71, one for each denominational order of the accumulator. The element 71 is provided with a groove in which fits the end of the short arm 72 of the lever 73 which is pivoted as shown and provided with a block 75 normally held as in Fig. 6 by armature latch 76 of adding magnet 77. A leaf spring 78 bears against the extremity of the longer arm of lever 73 and moves the same in counterclockwise direction upon release of block 75 by armature 76. This movement will bring clutching member 71 into engagement with cooperating teeth 79 integral with a gear 80 loosely mounted on shaft 69. Gear 80, when thus coupled to shaft 69, will rotate a gear 82 which meshes therewith and will displace the accumulator index wheel 83. The rearward extremity of lever 73 is adapted to be engaged by a finger 84 toward the end of the cycle for the purpose of disengaging clutch element 71 from teeth 79 and relatching block 75 on armature 76.

Briefly summarizing the adding operation, the magnet 77 may be energized at various points in the cycle of the machine, depending upon the location of a perforation in a column of the record card analyzed by the sensing brushes UB or LB. This energization may take place in response to a perforation in any of the index point positions from 9 to 1, inclusive. A perforation in the 9 index point position will trip the clutch element 71 nine steps before finger 84 is operated to declutch it, and a perforation in the 1 index point position will trip the clutch element 71 one step before it is declutched by the finger 84. Each step of clutching engagement corresponds to a tenth of a revolution of the accumulator index wheel 83, so that a "9" hole will move it nine-tenths of a revolution and a "1" hole will move it one-tenth of a revolution. The manner in which circuits through the card sensing brushes control the operation of magnet 77 will be set forth in connection with the explanation of the circuit diagram.

Readout mechanism

Also driven by gear 80 (Fig. 6) is a gear 109. Since the ratio of gears 109 and 80 is 2:1, the former will turn through a half revolution for each revolution of the latter. Carried by and insulated from gear 109 is a pair of electrically connected brushes 110, one of which cooperates successively with ten conducting segments 111 while the other cooperates with an arcuate conducting strip 112 or a segment 112a. The relationship of the parts is such that, when the index wheel 83 is in its zero position, one of the brushes 110 is in contact with the zero segment 111 and the other brush is in contact with the segment 112a, thus forming an electrical connection between the two.

If the wheel 83 is displaced to indicate a significant digit, say 8, then one of the brushes 110 will be in contact with the "8" segment 111 and the other brush will be in contact with the arcuate strip 112. The positioning of the brushes 110 provides a convenient electrical readout mechanism for controlling total transferring and total printing operations, and the electrical circuits involved in these functions will be more fully explained in connection with the circuit diagram.

Elusive one

Figure 5:
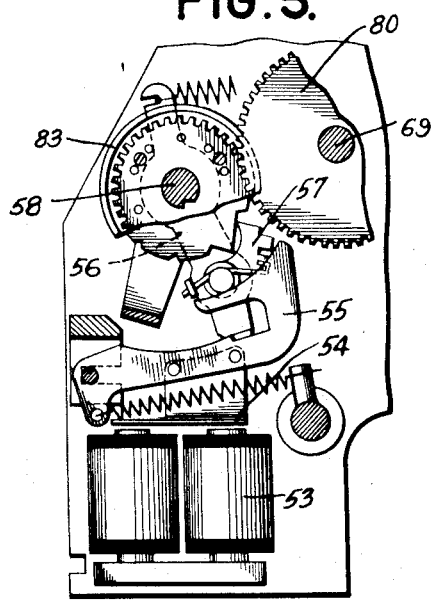
Fig. 5 is a detail view of the units order of an accumulator showing the mechanism for entering the elusive one during subtracting operations.

During subtracting operations, it is necessary to add the socalled fugitive or elusive one into the units order of the accumulators. The mechanism by means of which this elusive one is entered into the accumulator is illustrated in Fig. 5 where the units order index wheel 83 has associated therewith a magnet 53 whose armature 54 is secured to the carry lever latch 55 of the units order so that energization of magnet 53 will trip the units pawl carrying arm 56 whereby, during the carrying portion of the machine cycle, the pawl 57 associated with the units order will advance the units index wheel 83 one step.

Accumulator resetting mechanism

The shaft 58 (Figs. 2 and 6) upon which the index wheels 83 of an accumulator are loosely mounted is slotted for cooperation with spring pressed pawls (not shown) pivoted upon and carried by the individual index wheels, in such manner that counterclockwise rotation of shaft 58 will engage and drive the index wheels 83 forwardly to zero position during a single revolution of shaft 58.

Referring to Fig. 2, shaft 58 carries a gear 59 at its extremity which is in engagement with gear 60 mounted upon reset shaft 61. Gear 60, of which there is one for each accumulator, may be selectively coupled to the resetting shaft 61 in the well known manner more fully explained in Patent 1,976,617 above referred to. At the extremity of shaft 61 is a gear 62 which is adapted to be driven by a gear 63 which is secured to shaft 64. Fixed to gear 63 is an arm 65 which carries spring pressed clutch dog 66 normally held in the position shown in Fig. 2 by a latching arm 67 supported by armature shaft 68 of magnet 70. Energization of magnet 70 will release dog 66 for engagement with clutch driving element 38. Element 38 is integral with a gear 39 which meshes with a gear 40 secured upon constantly running shaft 19. With this arrangement, drive element 38 is in constant rotation and, whenever it is desired to effect resetting of the accumulators, magnet 70 is energized to provide a connection between the element 38 and the resetting shaft 61.

Subtracting mechanism

For the purpose of the present invention, the accumulators are provided with subtracting mechanism of well known construction, whereby entries may be made in the form of complements. Such mechanism is fully shown and described in Patent 1,976,617, and one order thereof may be briefly explained in connection with Fig. 6. In the operation of the present subtracting accumulator, the entry of the nine complement of a number to be subtracted is effected by initially tripping all the adding magnets 77 as though to add "9" in each position and causing the perforation in the record card to declutch the adding mechanism in accordance with the location of the perforation. This will result in the addition of the 9 complement of the number.

Secured to shaft 116 are a plurality of clutch elements 117, one for each denominational order position of the accumulator, and cooperating with each element is a clutching dog 118 pivoted at 119 to a cam 120 freely mounted on shaft 116. Also freely mounted on the shaft is a triple armed member 121, one of whose arms engages a pin 122 in the free end of dog 118 to hold the latter out of engagement with the driving element 117. Each of the arms of member 121 is adapted to cooperate in turn with a pawl 123 which is carried by clutch element 124 pivoted at 125. The pawl 123 is resiliently mounted on element 124 through spring and pin connection 126. A magnet armature 127 is pivoted at 128 and has a pin 129 in a laterally extending arm thereof which is adapted, upon energization of subtracting magnet 130, to rock element 124 in a clockwise direction to release member 121, thereby permitting springs 131 to rock the element in a counterclockwise direction through pin 122 and at the same time permit the engagement of dog 118 with the driving element 117. The cam 120 will thus be driven in a counterclockwise direction until the next arm of member 121 is engaged by pawl 123, which then causes disengagement of the clutch and interruption of further movement of the cam. The cam 120 is provided with three notches 132 about its periphery, into which a roller 133 rises successively.

Upon the initial movement of cam 120, the higher concentric portion of cam 120 will depress roller 133 and with it slider 134 upon which the roller is pivoted. A pin 135a extending axially from roller 133 engages a horizontal arm of element 124 to cause the positive restoration of clutch pawl 123 and armature 127 immediately after the clutching action. Slider 134 (see also Fig. 7) has adjustably connected thereto a slider 135 which is vertically positionable with respect to slider 134, as by pin and slot connection 136. The lower extremity of slider 135 is provided with a notch into which the horizontal arm of a bell crank 137 is fitted. The bell crank is pivoted at 138 and its depending arm lies adjacent to an edge of the clutch arm 73, so that the downward movement of slider 135 will cause the bell crank 137 to engage and move arm 73 in a declutching direction at a time determined by the time of energization of magnet 130, which is controlled by circuits extending through the lower brushes.

It is desirable at the time of declutching of the adding mechanism to cause the positive restoration of the armature 76 of magnet 77 which ordinarily would not be positively restored until the end of the cycle. This is effected through an arm 139 pivoted at 140 and having connection with the slider 134 through a stud 141. Arm 139 carries a spring pressed pivoted finger 142 whose downwardly extending portion is adapted to engage the armature 76 and move it away from its magnet 77. A spring 143 is provided to move arm 139 and incidentally slider 134 upwardly after they have been depressed. Arm 139 is also provided with an offset finger 144 which engages a horizontally slidable rod 145 whose opposite end is connected through a pin to a finger 146 pivoted at 147. The free end of finger 146 lies in the path of pins 97 and the finger will be moved into cooperation with one of the pins 97 at the time that declutching is effected as just described. This will prevent overthrowing of the index wheel 83 which might otherwise take place due to the high speed at which this mechanism is operated.

In Fig. 6 the shaft 116 has driving connection through usual gearing (not shown) with shaft 69 such that shaft 116 makes two revolutions for one revolution of shaft 69.

Circuit controlling devices

Figure 4:
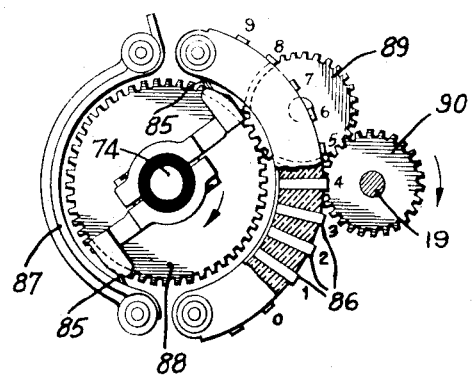
Fig. 4 is a detail of an impulse emitting commutator.

Carried by a stud 74 (Fig. 4) coaxial with shaft 64 is a pair of electrically connected brushes 85, one of which contacts with conducting segments 86 while the other wipes over a common arcuate conducting strip 87. The brushes 85 are carried by a gear 88 driven through an idler 89 from a gear 90 carried by constantly running shaft 19, and the timing is such that a brush 85 successively contacts with each of the segments 86 as a corresponding type element 31 of Fig. 3 approaches printing position opposite platen 32. These contact devices, of which two are provided, are generally known as emitters and control the transferring and total printing circuits in a manner to be more fully explained hereinafter.

On the circuit are shown a plurality of cam controlled contacts whose operation is controlled by cams carried by shaft 19. These contacts are prefixed CC to indicate that they function during all cycles of operation. Similar cam controlled contact devices prefixed with the letter RC are carried by or may be driven from the shaft 61, and these devices are in operation only during resetting operations.

In Fig. 1 is shown a shaft 81 which is driven from the gears of the card feeding mechanism and rotates only when cards are being advanced. Controlled by suitable cams on shaft 81 are contacts, each of which is designated by the letter CF, indicating that they are associated with the feeding mechanism and operative only when the feeding mechanism functions.

A gear 91 on shaft 81 drives a gear 92 at a 1 to 2 ratio so that a shaft 93 makes a half revolution for each card feed cycle. On this shaft are several contact operating cams which are generally designated FC for identification.

Figure 9:
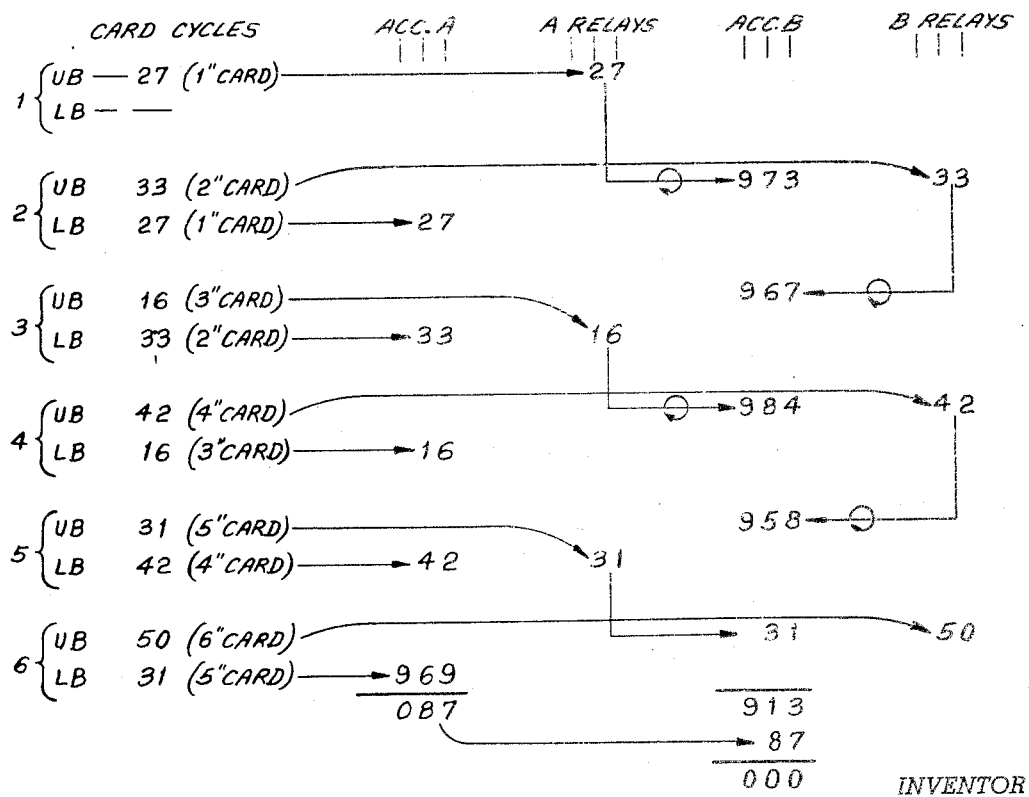
Fig. 9 is a diagram showing the sequence of operation of the machine.

A further contact designated LC is driven with the print cam 21 of Fig. 3 when such cam operates. The timing of the various cam operated contacts is shown in the timing diagram (Fig. 9).

With the arrangement described, the card feeding mechanism, the printing mechanism and the resetting mechanism may be selectively operated from the constantly running shaft 19 by energizing their respective clutch magnets 18, 24 or 70.

Before tracing the circuits, a brief explanation of the procedure involved will be given in connection with Fig. 9. Two accumulators are employed, designated "Acc A" and "Acc B" for each of which but three orders are indicated for simplicity. Also utilized are two sets of relays designated "A relays" and "B relays," each set of relays being divided into three denominationally ordered positions which relays are employed to receive data and retain the same on their contacts. A group of five cards is represented upon which are perforated the amounts 27, 33, 16, 42 and 31, and as the first card bearing an amount 27 passes the upper sensing brushes UB such amount is entered into the A relays as indicated on the line for card cycle 1.

During card cycle 2, the first card is passing the lower sensing brushes LB while the second card is passing the upper sensing brushes. Amount 27 is entered into Acc A, amount 33 is entered into the B relays and at the same time the amount 27 is entered from the A relays into Acc B subtractively, i. e. in the form of a tens complement. At the end of this cycle the A relays are cleared.

During card cycle 3, amount 33 is entered into Acc A from brushes LB, amount 16 is entered into the A relays from brushes UB and amount 33 is entered into Acc B subtractively from the B relays. Card cycle 4 is the same as cycle 2.

During card cycle 5, it is ascertained at brushes UB that the amount 31 is negative and devices are conditioned so that during the next following cycle the amount 31 read out of the A relays is not subtractively entered into Acc B but is directly entered therein. Also the amount 31 is entered as a complement from the brushes LB into Acc A.

After all the cards of the group have been sensed (the "6" card being the first of a new group), Acc A stands at 087 and Acc B stands at 913 which is the tens complement of 87. A transfer cycle of operation now takes place as a result of the usual group control mechanism sensing the advent of a new group of cards, and during this cycle the amount in Acc A is transferred to Acc B so that the Acc B is advanced to zero. If the results obtained in the two accumulators did not register as complements of one another, Acc B would not clear out but would have some significant digit standing therein. A test is made for the presence of zeros in all orders of Acc B and, if such condition is found, operations proceed to cause printing of the result 87 from Acc A. If the amounts are not in agreement, resumption of card feeding is prevented.

Circuit diagram

*Preliminary cycles.*—With a group of cards placed in the hopper of the machine and plug connections made as will be explained later, the machine is ready to start. Closure of the main line switch (not shown) puts current on lines 200 and 201 so that motor M (Fig. 10) is in constant operation and the constantly running shafts rotate. Relay magnet R3 becomes energized immediately through a circuit from line 200, relay contacts R5b, R4b and magnet R3 to line 201. Magnet R3 closes its contacts R3a and R3c and opens its contacts R3b and R3d which, however, have no effect at this time. When cam contacts CC1 close, a circuit is completed from line 200, contacts R5b, contacts CC1 and relay magnet R4 to line 201. Magnet R4 opens its contacts R4b to deenergize magnet R3. It also closes its contacts R4c to provide a holding circuit through contacts RC2 which maintain magnet R4 energized until a reset cycle takes place.

It is assumed that when starting the machine Accs A and B are clear with their readout brushes 110 all contacting their respective zero segments 111 as indicated in Fig. 10. The common strips 112 extend only from the 1 to 9 positions and in the zero position there is a separate section designated 112a (see also Fig. 6). The 0 segments 111 and sections 112 are wired so that with all accumulator order brushes 110 standing at zero a series circuit is traceable from line 200, wire 202, sections 112a, brushes 110 and 0 segments 111 in series, wire 203, and relay magnet R6 to line 201.

Figure 8:
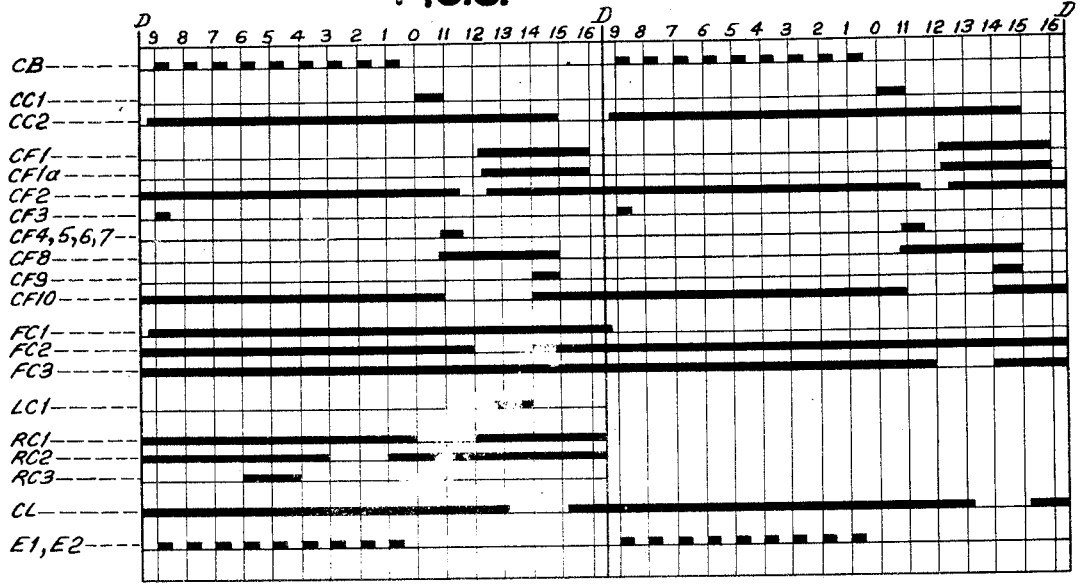
Fig. 8 is a timing chart of certain of the cam controlled contact devices of the machine.

Magnet R6 closes its contacts R6a (top of Fig. 10) so that, when contacts R4a close as explained, a circuit is completed from line 200, contacts R6a, R4a, R2a and print clutch magnet 24 to line 201. The printing mechanism is thus coupled for a cycle of operation during which the type bars are idly reciprocated and during which cam contacts LC1 close at the time indicated in Fig. 8 to complete a circuit from line 200, contacts LC1, reset clutch magnet 70 to line 201. In parallel with magnet 70 is a relay magnet R2 which is energized therewith and which closes its contacts R2b to provide a holding circuit for magnets R2 and 70 through contacts RC1.

An idle reset cycle now takes place during which contacts RC2 open to deenergize relay magnet R4. Contacts R2a are held open by magnet R2 to prevent further energization of print clutch magnet 24. Also, during this cycle contacts RC1 open to deenergize magnets 70 and R2 after magnet R4 is deenergized.

*Group control circuit setup.*—A further pair of contacts RC3 close during this reset cycle to complete a circuit from line 200, contacts RC3, group control relay magnet R5, contacts CF2 and wire 204 to line 201. The magnet R5 closes its contacts R5c to provide a holding circuit, shunting contacts RC3. The magnet R5 also opens its contacts R5b to break the circuit of magnet R3 and prevents further energization of magnet R4 until magnet R5 becomes deenergized. Shortly after contacts RC3 close and open again, contacts RC2 open to deenergize magnet R4 and shortly thereafter contacts RC1 open to deenergize magnets R2 and 70.

*Card feed control circuits.*—The machine is now conditioned to feed cards and the start key contacts 205 are closed to complete a circuit through relay magnet R1 and a parallel circuit through contacts R5a (now closed) and the card feed clutch magnet 18. The start key is held depressed, or alternatively, repeatedly operated until the leading card is about to pass the lower sensing brushes LB. Just prior to the passage of the card past the upper sensing brushes UB, the usual upper card lever contacts UCL are closed by the card, thus completing a circuit through the upper card lever relay magnet UCLR. This relay magnet is maintained energized as long as cards are fed by the fact that cam contacts CF1a overlap the time that the card lever contacts are open, due to the space between the cards. Upon energization of the upper card lever relay magnet UCLR, a holding circuit for the card feed clutch magnet and the R1 relay is completed through the contacts UCLRa and contacts R1a. In a similar manner, as the first card passes the lower sensing station, the lower card lever contacts LCL are closed energizing the lower card lever relay magnet LCLR. This magnet also is maintained energized as long as cards are being fed, by means of the cam contacts CF1. The contacts LCLRa which parallel contacts UCLRa are for the purpose of maintaining the card feed unit functioning until the last card has passed the lower sensing brushes.

*Group control circuits.*—To group control on certain classes of data plug connections must be made from the plug sockets 206 of the upper sensing brushes corresponding to columnar positions in which this control data is recorded, to one side of the double wound relay magnets 207, through representative connection 208, to socket 209, and from the other side of the relay magnets 207, through plug connections 210 which are made between sockets 211 and 212 which correspond to the same columnar positions of the lower sensing brushes as the plug sockets of the upper sensing brushes. A plug connection 215 is also made from the plug socket 213 to one of the plug sockets 214, according to the number of positions being controlled on, and switch S1 is opened. As cards are passing the upper and lower sensing brushes, a circuit will be complete through the pickup winding of magnet 207 if the differentially positioned control data holes agree. A holding circuit is established for this magnet from line 200 through the cam contacts CC2, contacts 207a, and wire 204 to line 201. After the cards passing the sensing brushes have been analyzed, the cam contacts CF2 open. If all of the control data agrees, all of the utilized contacts 207b will be closed and, as they form a shunt circuit around contacts CF2, the circuit through magnet R5 will be maintained. However, if the data in any one of the columns of the control field disagrees, its corresponding contacts 207b would be open at the time contacts CF2 opened, and the magnet R5 will deenergize. The deenergization of magnet R5 causes card feeding operations to stop by the opening of contacts R5a. The dropping out of magnet R5 also initiates a checking cycle of operations after which follows a total print cycle and then a reset cycle. During the reset cycle, the magnet R5 is re-energized by the closure of contacts RC3. The reenergization of magnet R5 initiates card feeding operations at the completion of the reset cycle by the closure of contacts R5a completing the circuit through the card feed clutch magnet.

*Adding.*—For straight addition, it is necessary to make plug connections 217 from the sockets 212 of the lower sensing brushes LB to the sockets 216 of the accumulators. As the record card passes the lower sensing brushes, circuits will be completed through the add magnets 77 at differential times, according to the positions of the holes in the record card, as follows: line 200, contacts CB, contacts LCLRc, contact roll, hole in card, corresponding brush LB, plug socket 212, connection 217, to plug socket 216, normally closed contacts R16c, add magnet 77, to line 201.

*Subtracting.*—Record cards having amounts to be subtracted have an "X" hole punched in a predetermined column. The plug connections required for this type of run are as follows: plug sockets 212 (of the amount fields) are connected as for adding to plug sockets 216 of the accumulator. From plug socket 206 of the brush UB related to the column containing the "X" hole there is a plug connection 219 made to plug socket 218.

As the record card passes the upper brushes UB, if an "X" hole is punched in the control column, a circuit is completed through the magnet R8 (assuming the entries are being made into accumulator A) as follows: line 201, contacts UCLRc, upper contact roll, hole in card to socket 206, plug connection 219 to plug socket 218, through contacts CF4 (which close at 11, see timing chart), magnet R8 to line 200.

The energization of magnet R8 sets up a holding circuit for itself back through contacts CF8, through its contacts R8a. Energization of R8 also completes a circuit through magnet R12 as follows: line 201, through contacts CF9, contacts R8b and magnet R12 to line 200. Magnet R12 sets up a holding circuit for itself back through contacts CF10. For straight adding and subtracting the switch S6 is set to position No. 1; thus, when magnet R12 is energized, the contacts R12b are closed and complete a circuit through magnet R16. With magnet R16 energized, its contacts R16a, R16b and R16d are closed and its contacts R16c are opened. The R12 and R16 magnets are maintained energized until the card has been analyzed by the lower brushes, and thus when contacts CF3 close, all of the add magnets 77 will be energized and the elusive one magnet 53 will be energized. At differential times according to the location of the holes in the card circuits will be completed through the subtract magnets 130, thus causing the accumulator mechanism to be declutched after entry of the tens complement of the amount sensed.

*Total print circuit.*—The plugging required for total printing is from sockets 220, connection 221 to sockets 222, connection 223 from sockets 224 to sockets 225. Switches S2 and S3 are closed. Upon energization of magnet R4 upon closure of cam contacts CCI in the cycle following after a break in control occurs, as previously explained (see Fig. 8 where it is seen that contacts CCI close at the "0" point in the following cycle, almost a full cycle after contacts CF2 open to detect a group change or break in control), the contacts R4d are closed completing a circuit to the emitter EI, then over the digital wires 226 to the segments III, through the readout brushes 110, to plug socket 220, plug wire 221, plug socket 222, contacts R3b, plug socket 224, plug connection 223, plug socket 225, print magnet 36 to line 201. The delay of a cycle after a group change is to provide time to transfer the entry from the A or B relays to accumulator B so that, when transfer from accumulator A to accumulator B occurs, both will have received the same number of entries.

*Storing device circuit.*—Provision is made to read the data on each card, as the card passes the upper sensing brushes, into a storing device. The stored data is held for one cycle and the data is read out of the storing device during the next cycle. Due to the one cycle delay, it is necessary to have two storage devices per column designated "A" group and "B" group, and the circuits are so arranged that while setting up the "A" group, data is being read out of the "B" group; and when setting up the "B" group, data is being read out of the "A" group. This is controlled by means of the cam contacts FCI (Fig. 10a) which make one revolution in two machine cycles and the magnet R7. The circuit for setting up the storage devices is as follows: plug connections 226 are made from upper brush sockets 206 (Fig. 10) to socket 227 (Fig. 10a). As the card passes the upper brushes UB, circuits are completed at differential times, according to the position of the holes in the card as follows: line 201, contacts UCLRc (Fig. 10), upper contact roll, hole in card, socket 206, plug wire 226, socket 227 (Fig. 10a), contacts R7a or R7b, pickup coil of one of the magnets 228 of the "A" or "B" group of relays, wires 229 and 230 corresponding to the hole sensed, emitter E2, wire 231 (Fig. 10), CB contacts, to line 200. Each relay of the "A" and "B" group have a pickup and holding coil mounted on a common core, the circuit through the holding coil being completed from line 200, wire 232 (Fig. 10a), through contacts FC2, wire 233, contacts 228a, holding coil of magnet 228 to line 201 for the "A" group and through contacts FC3 and wire 234 for the "B" group.

For reading out the stored information, plug connections 235 are made from sockets 236 (Fig. 10a) to sockets 216, and the circuit is as follows: line 200, through contacts CB (Fig. 10), wire 231 (Fig. 10a), emitter E2, wires 230, 237, a contact of the "A" or "B" contact group 228b, relay contacts R7c or R7d, socket 236, plug wire 235 (Fig. 10) to socket 216, contacts R16c or R17c, one of the add magnets 77, to line 201. An alternate circuit is through R16d or R17d, subtract magnet 130, to line 201, if the amount is to be entered subtractively.

*Cross adding circuit*

The cross adding circuit is for the purpose of adding or combining the amount standing in one accumulator with the amount standing in another accumulator. For example, suppose that the amount in accumulator A is to be added to the amount in accumulator B. The plugging is as follows: connection 221 (Fig. 10), from readout socket 220 of accumulator A, to socket 222, as explained for total printing, connection 238 from socket 239 to socket 216 of accumulator B. Thus, when the R3 relay is energized after a group change, the contacts R3a are closed and the contacts R3c are also closed, and circuits are completed at differential times as follows: from line 200, through contacts CB, wire 231, contacts R3a, emitter EI, accumulator A readout, socket 220, plug wire 221, socket 222, contacts R3c, socket 239, plug wire 238, socket 216 of Acc B, contacts R17c, accumulator magnet 77 to line 201.

*Problem*

The entire sequence of operation of the several circuits hereinabove traced will now be explained to show how they are coordinated to handle the problem of Fig. 9.

The lower brushes which read the amount field are connected for entry into Acc A through connections, such as 217. The corresponding upper brushes are connected for entry into the A and B relays through connections such as 226. Transfer connections 221, 238 are made to transfer from Acc A to Acc B and total print connection 223 is also made. Switch S6 is set in its "1" position and switch S7 is set in its "2" position. Class selection plug wire 219 is made to socket 218 and a further connection 240 (Fig. 10) is made. With the usual group control connections 208, 210 and 215 also made the machine is ready to start.

Since the A and B relays operate alternately under control of the half revolution FC cam contacts, the entry from the first card as it passes brushes UB may be into either group of relays. We will assume, therefore, that the A relays are in condition to receive the entry as the first card passes brushes UB. This entry is through connections 226 and is evidenced by energizaztion of the "7" magnet 228 in the units order and energization of the "2" magnet 228 in the tens order of the A relays with resultant closure of the related contacts 228b.

During the second card sensing cycle amount 27 is entered directly from brushes LB, through connections 217 into Acc A. Magnet R17 is energized so that through contacts R17a the elusive 1 magnet 53 of Acc B is energized and entry circuits for this accumulator are completed from the readout contacts 228b of the A relays, through connections 235, to the subtract magnets 130 of Acc B. Also during this cycle, with magnet R7 energized the upper brushes are connected through contacts R7b to the B relays and as a result the amount 33 on the second card is entered into the B relays. Near the end of the cycle contacts FC2 open to deenergize the A relays.

During the third cycle, the amount 33 is entered into Acc A from brushes LB and concurrently the amount 33 is entered as a complement into Acc B, while the amount 16 is entered into the A relays and the B relays are subsequently cleared.

The fourth cycle is a repetition of the second, and the fifth cycle is a repetition of the third. During the fifth cycle, however, the X hole designating that the amount 31 on the fifth card is a negative quantity is sensed and through connections 219 and 240 causes energization of magnets R8 and R9 which in turn cause energization of magnets R12 and R13, which in turn are held energized through contacts CF10 until this fifth card has been sensed by brushes LB. As a result, while the fifth card is passing brushes LB, the magnet R16 is energized and magnet R17 is deenergized so that the amount 31 is entered into Acc A as the complement 969, and the amount 31 in the A relays is entered into Acc B as a true number. During the cycle the amount 50 on a sixth card is entered into the B relays.

It is assumed that the first five cards have the same classification and the sixth card is the first of a new group, so that during this cycle a group change is detected upon opening of contacts CF2 with the resultant deenergization of relay magnet R5. Its contacts R5a open to interrupt feeding and its contacts R5b close to energize magnet R3. This happens after contacts CC1 have closed and opened again during the last card feed cycle, so that during the entering portion of the next cycle contacts R3a connect emitter E1 to line 200 and transfer takes place from the readout of Acc A through connections 221 and 238 (contacts R3c being also closed), to AccB. It is to be noted that contacts R3d are also open at this time so that magnet R17 becomes deenergized permitting the entry of the total 87 in Acc A to be made additively into Acc B, which latter accumulator contains the complement 913 resulting in moving the wheels of Acc B to zero.

When contacts CC1 close during the transfer cycle, magnet R4 is energized, closing its contacts R4a and later after the tens carry part of the cycle, if Acc B stands at zero in all orders the comparison circuit is completed from line 200, closed switch S2, the zero segments and brushes of Acc B and wire 203 to energize magnet R6. If the accumulator brushes are not all at zero, R6 is not energized.

Magnet R6 closes its contacts R6a and the print clutch magnet 24 is energized, so during the next following cycle circuits are completed through the now closed contacts R4d, emitter E1, the readout of Acc A, connections 221, the now closed contacts R3b, (now closed because relay R4 when energized opens contacts R4b to break the circuit to relay R3) and connection 223 to print magnets 36. If R6 is not energized, this print cycle does not take place and nothing happens but the continued turning of the constantly running shafts. This serves as an indication that the two accounts did not agree in their summation. The operator then closes correction key contacts 242 to energize magnet 24.

During the print cycle contacts LC1 energize magnets R2 and reset clutch magnet 70, so that during the ensuing reset cycle the accumulators are both zeroized and during this reset cycle contacts RC3 close to reenergize the group control magnet R5, which closes its contacts R5a to reenergize the card feed clutch magnet 18 and cards resume feeding.

The first of the new group now passes brushes LB and its amount 50 is entered in Acc A. It will be recalled that the amount was entered into the B relays as the card passed the upper brushes previously. The B relays have retained the amount and now enter the same subtractively into Acc B. The feeding continues until another group change occurs whereupon a transfer cycle takes place followed by print and reset cycles, if there is agreement.

With the arrangement described, the brushes LB and Acc A constitute one calculating device and the brushes UB, the A and B relays and Acc B constitute a second calculating device, each of which devices acts separately and independently under control of the same data on the cards, so that if both arrive at the same result (in different forms), the net effect is the same as running the cards through two separate tabulating machines.

It is to be noted that by closing both switches S2 and S3, magnet R6 is continuously energized and the accumulators may both be used to algebraically accumulate from the lower brushes directly.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. In a machine having means for sensing a field in each of a group of record cards for amount designations, an accumulator controlled thereby to add the amounts sensed, total printing mechanism and group control mechanism effective upon a group change for rendering the total printing mechanism effective to print the amount standing in said accumulator, in combination with a second sensing means for sensing the same field in each card prior to the sensing thereof by the first named sensing means, a second accumulator, entering means therefor arranged for entering amounts subtractively, means controlled by said second sensing means for causing said entering means to subtractively enter the amounts sensed, into said second accumulator, timing means for causing said entry to occur concurrently with the additive entry into the first accumulator, transferring means for transferring the total in the first accumulator to the second additively, means controlled by said group control mechanism for rendering the transferring means effective upon a group change, means for ascertaining whether the amount in the second accumulator is zero after said transfer, and means controlled by said ascertaining means when said amount is not zero for preventing operation of said total printing mechanism.

2. In a record controlled apparatus, means for sensing a field in each of a group of records for amount designations, further means for repeating the sensing of the same fields in the records, a pair of accumulators, entering means for each for causing additive or subtractive entries, the entering means of one accumulator being controlled by the second named sensing means to enter the amounts sensed additively, means controlled by the first named sensing means for causing the entering means of the other accumulator to enter the same amounts subtractively, group control mechanism, and means controlled thereby when the amounts on all the cards have been entered into both accumulators for transferring the amount in one accumulator to the other, means for ascertaining whether the combined amounts in the accumulator receiving the transfer has resulted in a zero setting, and means controlled thereby for controlling a subsequent operation of the apparatus.

3. In a machine of the class described having a pair of electrical sensing devices of opposite polarity, means for feeding record cards first past one sensing device and then past the other device in succession, group control mechanism responsive to the completion of a series circuit through both sensing devices, and a pair of accumulators each directly controllable from only the second one of said sensing devices, in combination with a pair of storage devices each having entering means and readout means, means for alternately connecting the entering means of the pair of storage devices to the first sensing device to enter data into the storage devices alternately from successive record cards, a set of connections between each of the pair of readout devices and one of said accumulators, further connections between the second sensing device and the other accumulator, means for rendering said sets of connections alternately effective as the record cards pass the second sensing device, whereby the data sensed by the second sensing device will be directly entered into one accumulator and the data primarily sensed by the first sensing device will be entered into the other accumulator under control of the readout means of the storage device that received such data, so that for a succession of record cards both accumulators will concurrently accumulate totals representative of the same result, each under control of its related sensing device, a means for ascertaining whether the amounts standing in the two accumulators represent the same result, means controlled by said group control mechanism upon a group change for rendering said ascertaining means effective, and means controlled thereby when the totals represent the same result for initiating a further operation of the machine.

4. In a machine having means for sensing a field in each of a group of record cards for amount designations, an accumulator controlled thereby, printing mechanism and group control mechanism effective upon a group change for rendering the printing mechanism effective to print the total standing in said accumulator, in combination with a second sensing means for sensing the same field in each card prior to the sensing thereof by the first named sensing means, a second accumulator, entry means therefor, storage means controlled by said second sensing means for receiving amount designations, means controlled by the storage means for causing said entry means to enter the amounts sensed by the second sensing means into the second accumulator, concurrently with their entry under control of the first named sensing means into the first accumulator, a readout device for each accumulator settable to represent the amounts in their respective accumulators, means including said readout devices for ascertaining whether the amounts standing in the two accumulators represent the same result, means controlled by the group control mechanism for rendering the ascertaining means effective upon a group change, and means controlled by said ascertaining means when the settings are alike for initiating the operation of said printing mechanism.

5. The invention set forth in claim 1 in which the entering means of both accumulators are arranged for entering amounts additively or subtractively and there is provided settable connections, to cause either accumulator to be controlled by the first sensing means for additive operation, and the other accumulator to be controlled by the second sensing means for subtractive operation, further settable connections intermediate the two accumulators to cause either accumulator to transfer its amount to the other accumulator, and still further settable connections to cause the ascertaining means to ascertain selectively for either accumulator the presence of zeros in the accumulator after a transfer operation.

JAMES W. BRYCE.